Figure 1:
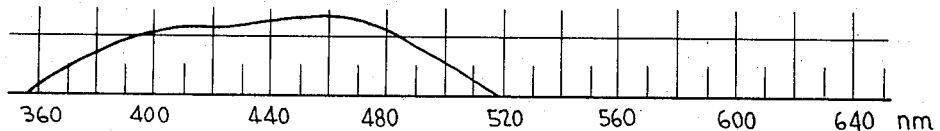

3,359,113
SILVER HALIDE EMULSIONS SENSITIZED WITH METHINE DYES CONTAINING AN IMIDAZOLE NUCLEUS
Henri Depoorter, Marcel Jan Libeer, and Jean Marie Nys, Mortsel-Antwerp, Belgium, assignors to Gevaert Photo-Producten N.V., Mortsel-Antwerp, Belgium, a Belgian company
Filed Mar. 30, 1964, Ser. No. 355,882
Claims priority, application Great Britain, Mar. 4, 1964, 9,100/64
7 Claims. (Cl. 96—106)

This invention relates to new methine dyes, to methods for preparing them and to their use as optical sensitizing agents in light-sensitive materials. More particularly this invention relates to methine dyes containing an imidazole nucleus having in the 2-position a methine chain, which is substituted in the α-position in respect of said nucleus with a cyano group.

These dyes represent a new class of methine dyes since no methine dyes comprising an imidazole nucleus were prepared hitherto. They are very suited optical sensitizing agents for light-sensitive silver halide and for photoconductive substances such as photoconductive zinc oxide.

So, it is an object of the present invention to provide a new class of methine dyes. A further object is to provide methods for preparing these new dyes. Still another object is to provide photographic silver halide emulsions sensitized with these new dyes. Other objects will become apparent from the description and examples.

More particularly we provide new methine dye salts represented by the following general formula:

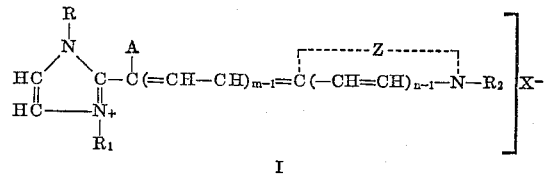

wherein:

A represents a cyan group,

Each of R, $R_1$ and $R_2$ (the same or different) represents an alkyl group such as methyl, ethyl, n-propyl, n-butyl, n-amyl, isopropyl, isobutyl, a substituted alkyl radical such as β-hydroxyethyl, β-acetoxyethyl, sulphoethyl, sulphopropyl, sulphobutyl, propyl sulphate or butyl sulphate, an unsaturated aliphatic radical such as allyl, an aralkyl radical such as benzyl, a substituted benzyl radical such as carboxybenzyl, an aryl radical such as phenyl, a substituted aryl radical such as carboxyphenyl, a cycloalkyl radical such as cyclohexyl; further $R_1$ and/or $R_2$ (the same or different) may also represent a substituted alkyl group such as the group

—A—CO—O—B—SO$_2$—OH wherein A and B each represents a hydrocarbon group as described in the United Kingdom patent specification 886,271, or the group —A—W—NH—V—B, wherein A represents a methylene radical, an ethylene radical, a propylene radical or a butylene radical, B represents an alkyl group, an amino group, a substituted amino group and also a hydrogen atom in the case V is a single bond, and W and V each represents a —CO— radical, a —SO$_2$—radical or a single bond, but at least one of them is a —SO$_2$—radical as described in the United Kingdom patent specification 904,332, m represents an integer of from 2 to 3, n represents an integer of from 1 to 2, X represents an acid radical e.g. chloride, bromide, iodide, perchlorate, benzene sulphonate, p-tolusulphonate, methyl sulphate and ethyl sulphate, Z represents the atoms necessary to complete a heterocyclic nitrogen nucleus containing 5 to 6 atoms in the heterocyclic ring such as those of the thiazole series (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole), those of the benzothiazole series (e.g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, 4,5,6,7-tetrahydrobenzothiazole, 5,6-dimethoxybenzothiazole, 5,6-dioxymethylenebenzothiazole, 5-hydroxybenzothiazole, 6-hydroxybenzothiazole, 5,6-dimethylbenzothiazole), those of the naphthothiazole series (e.g. naphtho[2,1-d]thiazole, naphtho[1,2-d]thiazole, 5-methoxynaphtho[1,2-d]thiazole, 5-ethoxynaphtho[1,2-d]thiazole, 8-methoxynaphtho[2,1-d]thiazole, 7-methoxynaphtho[2,1-d]thiazole), those of the thionaphtheno-[7,6-d]thiazole series (e.g. 7-methoxythionaphtheno-[7,6-d]thiazole), those of the oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole), those of the benzoxazole series (e.g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 6-methoxybenzoxazole, 5-hydroxybenzoxazole, 6-hydroxybenzoxazole), those of the naphthoxazole series (e.g. naphtho[2,1-d]oxazole, naphtho[1,2-d]oxazole), those of the selenazole series (e.g. 4-methylselenazole, 4-phenylselenazole), those of the benzoselenazole series (e.g. benzoselenazole, 5-chlorobenzoselenazole, 5-methoxybenzoselenazole, 5-hydroxybenzoselenazole, 4,5,6,7-tetrahydrobenzoselenazole), those of the naphthoselenazole series (e.g. naphtho[2,1-d]selenazole, naphtho-[1,2-d]selenazole), those of the thiazoline series (e.g. thiazoline, 4-methylthiazoline, 4-hydroxymethyl-4-methylthiazoline, 4,4-bis-hydroxymethylthiazoline, 4-acetoxymethyl-4-methylthiazoline, 4,4-bis-acetoxymethylthiazoline), those of the thiazolidine series (e.g. 2-benzothiazolylidene-4-thiazolidone), those of the oxazoline series (e.g. oxazoline, 4-hyroxymethyl-4-methyloxazoline, 4,4-bis - hydroxymethyloxazoline-4-acetoxymethyl-4-methyloxazoline, 4,4-bis-acetoxymethyloxazoline), those of the oxazolidine series, those of the selenazoline series (e.g. selenazoline), those of the 2-quinoline series (e.g. the quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline etc.), those of the 4-quinoline series (e.g. quinoline, 6-methoxyquinoline, 7-methylquinoline, 8-methylquinoline), those of the 1-isoquinoline series (e.g. isoquinoline, 3,4-dihydroisoquinoline), those of the 3-isoquinoline series (e.g. isoquinoline), those of the 3,3-dialkylindolenine series (e.g. 3,3-dimethylindolenine, 3,3,5-trimethylindolenine, 3,3,7-trimethylindolenine), those of the pyridine series (e.g. pyridine, 5-methylpyridine), those of the benzimidazole series (e.g. 1-ethylbenzimidazole, 1-phenylbenzimidazole, 1-ethyl-5,6-dichlorobenzimidazole, 1-hydroxyethyl-5,6-dichlorobenzimidazole, 1-ethyl-5-chlorobenzimidazole, 1-ethyl-5,6-dibromobenzimidazole, 1-ethyl-5-chloro-6-aminobenzimidazole, 1-ethyl-5-chloro-6-bromobenzimidazole, 1-ethyl-5-phenylbenzimidazole, 1-ethyl-5-fluorobenzimidazole, 1-ethyl-5,6-difluorobenzimidazole, 1-ethyl-5-cyanobenzimidazole, 1-(β-acetoxyethyl)-5-cyanobenzimidazole, 1-ethyl-5-chloro-6-cyanobenzimidazole, 1-ethyl-5-fluoro-6-cyanobenzimidazole, 1-ethyl-5-acetylbenzimidazole, 1-ethyl-5-chloro-6-fluorobenzimidazole, 1-ethyl-5-carboxybenzimidazole, 1-ethyl-7-carboxybenzimidazole, 1-ethyl-5-carbethoxybenzimidazole, 1-ethyl-7-carbethoxybenzimidazole, 1-ethyl-5-sulfamylbenzimidazole, 1-ethyl-5-N-ethylsulfamylbenzimidazole).

Further we provide new merocyanine dyes represented by the following general formula:

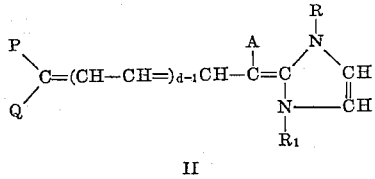

II wherein:

R, $R_1$ and A have the same significance as described hereinbefore, d represents a positive integer of from 1 to 2, and P and Q each represents an electro-negative group e.g. a —CN, —COOR$_7$ group, wherein $R_7$ represents a hydrogen atom or an alkyl radical e.g. an alkyl radical of the formula $C_wH_{2w+1}$ wherein w represents an integer from 1 to 4, or a —CO—R$_8$ radical, wherein $R_8$ represents an alkyl radical such as methyl or ethyl or an aryl radical such as phenyl, or P and Q represent in the radical

the necessary atoms to close a heterocyclic nucleus with electronegative character e.g. a cyclic ketomethylene nucleus such as those of the pyrazolone series (e.g. 3-methyl-1-phenyl-5-pyrazolone, 1-phenyl-5-pyrazolone, 1-(2-benzothiazolyl)-3-methyl-5-pyrazolone), those of the isoxazolone series (e.g. 3-phenyl-5-isoxazolone, or 3-methyl-5-isoxazolone), those of the oxindole series (e.g. 1-alkyl-2,3-dihydro-2-oxindoles), those of the 2,4,6-triketohexahydropyrimidine series (e.g. barbituric acid or 2-thiobarbituric acid as well as their derivatives such as those substituted in the 1-position by an alkyl group such as a methyl group, an ethyl group, an 1-n-propyl group and a 1-n-heptyl group, or those substituted in the 1- and 3-position by an alkyl group, or those substituted in the 1- or 3-position by a β-methoxy ethyl radical, or those substituted in the 1- and 3-position by an aryl radical such as a phenyl radical, or those substituted in the 1- and 3-position by a substituted phenyl radical such as a p-chlorophenyl radical, or a p-ethoxycarbonyl phenyl radical, or those substituted only in the 1-position by a phenyl-, a p-chlorophenyl- or p-ethoxy carbonylphenyl radical, further the mixed alkylaryl substituted derivatives such as 1-ethyl-3-phenyl- or 1-n-heptyl-3-phenyl derivatives, those of the rhodanine series (i.e. 2-thio-2,4-thiazolidinedione series), such as rhodanine, and aliphatic substituted rhodanines (e.g. 3-ethyl-rhodanine, or 3-allyl-rhodanine), those of the 2-imidazo[1,2α]pyridone series, those of the 5,7-dioxo-6,7-dihydro-5-thiazolo[3,2-α]pyrimidine series (e.g. 5,7-dioxo-3-phenyl-6,7-dihydro-5-thiazolo[3,2-α]pyrimidine), those of the 2-thio-2,4-oxazolidinedione series (i.e. those of the 2-thio-2,4-oxazoledione series (e.g. 3-ethyl-2-thio-2,4-oxazolidinedione), those of the thianaphthenone series (e.g. 3-thianaphthenone), those of the 2-thio-2,5-thiazolidinedione series (i.e. the 2-thio-2,5-thiazoledione series) (e.g. 3-ethyl-2-thio-2,5-thiazolidinedione), those of the 2,4-thiazolidinedione series (e.g. 2,4-thiazolidinedione, 3-ethyl-2,4-thiazolidinedione, 3-phenyl-2,4-thiazolidinedione, 3-alphanaphthyl-2,4-thiazolidinedione), those of the thiazolidone series (e.g. 4-thiazolidone, 3-ethyl-4-thiazolidone, 3-phenyl-4-thiazolidone, 3-alpha-naphthyl-4-thiazolidone), those of the 4-thiazolone series (e.g. 2-ethylmercapto-4-thiazolone, 2-alkylphenylamino-4-thiazolones, 2 - diphenylamino-4-thiazolone), those of the 2-imino-2,4-oxazolinone (i.e. pseudohydantoin) series, those of the 2,4-imidazolinedione (hydantoin) series (e.g. 2,4-imidazolinedione, 3-ethyl-2,4-imidazolinedione, 3-phenyl-2,4-imidazolinedione, 3-alpha-naphthyl-2,4-imidazolinedione, 1,3 - diethyl-2,4-imidazolinedione, 1-ethyl-3-phenyl-2,4-imidazolinedione, 1-ethyl-3-alpha-naphthyl-2,4-imidazolinedione, 1,3-diphenyl-2,4-imidazolinedione), those of the 2-thio-2,4-imidazolinedione (i.e. 2-thiohydantoin) series (e.g. 2-thio-2,4-imidazolinedione, 3-ethyl-2-thio-2,4-imidazolinedione, 3-phenyl-2-thio-2,4-imidazolinedione, 3 - alpha-naphthyl-2-thio-2,4-imidazolinedione, 1,3 - diethyl-2-thio-2,4-imidazolinedione, 1-ethyl-3-phenyl-2-thio-2,4-imidazolinedione, 1-ethyl-3-alphanaphthyl-2-thio-2,4-imidazolinedione, 1,3-diphenyl-2-thio-2,4-imidazolinedione), those of the 5-imidazolone series (e.g. 2-n-propylmercapto-5-imidazolone).

The new methine dye salts and merocyanine dyes according to the present invention preferably are prepared starting from a reactive intermediate product corresponding to the following general formula:

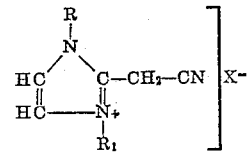

III wherein R, $R_1$ and $X^-$ have the same significance as set forth above.

The following preparations illustrate the way of preparing some of the intermediate products according to Formula III.

*Preparation 1*

1-benzyl-2-cyanomethyl-3-methylimidazolium iodide

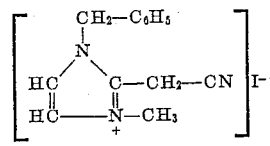

5.9 g. (0.03 mol) of 1-benzyl-2-cyanomethylimidazole prepared according to Reuben G. Jones, J. Am. Chem. Soc., 71, 384 (1949), and 4.7 g. (0.033 mol) of methyl iodide are heated for 18 h. in a pressure tube at 110° C. The formed product is finely ground and washed with acetone and ether. Yield: 9.1 g. (90%). Melting point: 200° C.

*Preparation 2*

1-benzyl-2-cyanomethyl-3-ethylimidazolium iodide

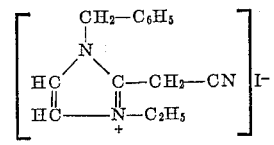

This product is prepared analogously to that of Preparation 1, starting, however, from 9.8 g. (0.05 mol) of 1-benzyl-2-cyanomethylimidazole and 8.6 g. (0.055 mole) of ethyl iodide. Yield: 12.4 g. (70%). Melting point: 185° C.

New asymmetrical methine dye salts according to the present invention can be prepared by condensing the benzimidazolium salt according to general Formula III with a cyclammonium quaternary salt represented by the following formula:

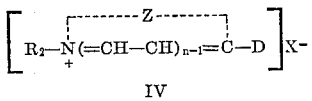

IV wherein:

$R_2$, X, Z and n have the same significance as set forth above, and

D represents a β-arylamino-vinyl group, a β-alkylmercapto-vinyl group, a β-arylmercapto-vinyl group, a β-acetanilido-vinyl group or a β-p-toluenesulphonanilido-vinyl group, which vinyl groups may carry a substituent.

Condensations of this type are advantageously carried out in the presence of a basic condensing agent, for example a trialkylamine such as triethylamine, a dialkylaniline, a heterocyclic tertiary amine such as pyridine or N-alkyl-piperidine, or the like. The condensations of this type can be carried out by allowing to react the intermediates in the presence of an inert diluent such as methanol, ethanol, diethylether, acetone, 1,4-dioxane, occasionally whilst heating.

New asymmetrical methine dye salts according to the present invention can also be prepared by condensing imidazolium salts of the general Formula III with a heterocyclic base of the following formula:

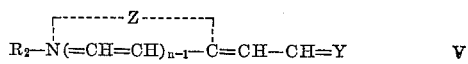

wherein:

$R_2$, $Z$ and $n$ have the same significance as set forth above, and

Y represents a reactive atom such as an oxygen atom, a sulphur atom, a selenium atom or a reactive group such as an aryl—N= group e.g. a $C_6H_5$—N= group.

The condensation of this type is advantageously carried out in the presence of an acid anhydride such as acetic anhydride.

New merocyanine dyes according to the present invention can be prepared by condensing the imidazolium intermediate according to the general Formula III with a compound represented by the following formula:

wherein:

P and Q have the same significance as set forth above, and
E represents an alkyl- or arylmercapto group, an alkoxy group, an arylamino group, an acetanilido group or a p-toluene-sulphon-anilido group.

The methine dye salts containing an imidazole nucleus having in the 2-position a methine chain, which is substituted in the α-position in respect of said nucleus with a carboxyl group, can be prepared by the hydrolysis in strong sulphuric acid of the cyano group of the corresponding cyano-substituted methine dye salts.

The following examples illustrate the preparation of the trimethine dyes according to the present invention.

EXAMPLE 1

The sensitizing dye of the formula:

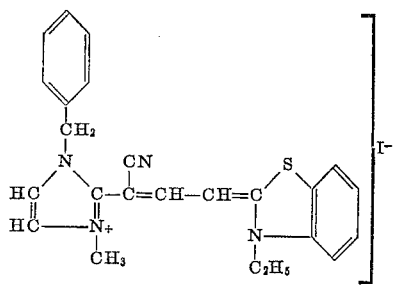

is prepared as follows:

7.5 g. (0.022 mol) of 1 - benzyl - 2 - cyanomethyl - 3 - methyl-imidazolium iodide and 6.2 g. (0.022 mol) of 2-(ω - phenyliminoethylidene) - 3 - ethyl - benzothiazoline are dissolved in 30 cm.³ of pyridine. Thereupon 30 cm.³ of acetic anhydride and 3.1 cm.³ of triethylamine are added, and the obtained solution is boiled for 5 min. After cooling 40 cm.³ of a mixture consisting of equal parts of ethanol and ether are added, and the formed dye is allowed to crystallize in a refrigerator. Yield of crude product: 6.8 g. (59%). Melting point: 170–180° C. This crude product is recrystallized twice from ethanol yielding 4.2 g. (36%) of pure dye. Melting point: 172° C. Absorption maximum: 484 nm. ($\epsilon=7.77.10^4$).

EXAMPLE 2

The sensitizing dye of the formula:

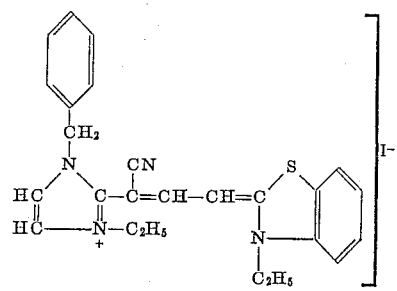

is prepared as follows:

To a solution of 3.5 g. (0.01 mol) of 1-benzyl-2-cyanomethyl-3-ethylimidazolium iodide and 2.8 g. (0.01 mol) of 2-(ω-phenyliminoethylidene)-3-ethylbenzothiazoline in 25 cm.³ of acetic anhydride, 1.4 cm.³ of triethylamine is added. The obtained solution is boiled for 15 min. and cooled in a refrigerator whereby the dye crystallizes. The dye is collected and recrystallized three times from ethanol with the help of active charcoal. Yield: 1.6 g. (30%). Melting point: 215° C. Absorption maximum: 480 nm. ($\epsilon=5.13.10^4$).

EXAMPLE 3

The sensitizing dye of the formula:

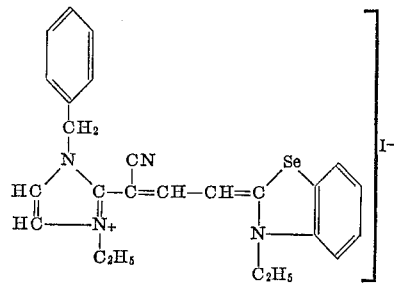

is prepared as follows:

To a solution of 1.76 g. (0.005 mol) of 1-benzyl-2-cyanomethyl - 3 - ethylimidazolium iodide and 1.65 g. (0.005 mol) of 2-(ω-phenyliminoethylidene)-3-ethyl-2,3-benzoselenazoline in a mixture of 10 cm.³ of pyridine and 10 cm.³ of acetic anhydride, 0.7 cm.³ of triethylamine is added. This mixture is heated for 10 min. in a water bath of 50° C. The formed dye is precipitated with ether, recrystallized from pyridine with the help of active charcoal and then recrystallized three times from ethanol. Yield: 0.45 g. (15%). Melting point: 190° C. Absorption maximum: 488 nm. ($\epsilon=5.01.10^4$).

EXAMPLE 4

The sensitizing dye of the formula:

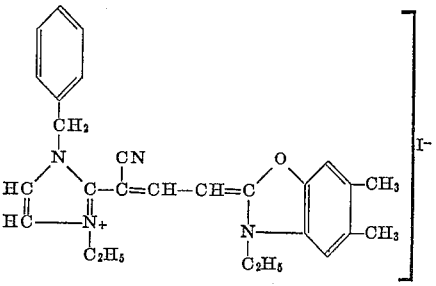

is prepared as follows:

To a solution of 1.76 g. (0.005 mol) of 1-benzyl-2- cyanomethyl-3-ethylimidazolium iodide and 1.46 g. (0.005 mol) of 2-(ω-phenyliminoethylidene)-3-ethyl-5,6-dimethyl-benzoxazoline in a mixture of 10 cm.³ of pyridine and 10 cm.³ of acetic anhydride, 0.7 cm.³ of triethylamine is added. This mixture is boiled for 30 min. The formed dye is precipitated with ether and recrystallized three times from a mixture of isopropanol and ether. Yield: 0.5 g. (18%). Melting point: 228° C. Absorption maximum: 466 nm. (ε=6.17.10⁴).

EXAMPLE 5

The sensitizing dye of the formula:

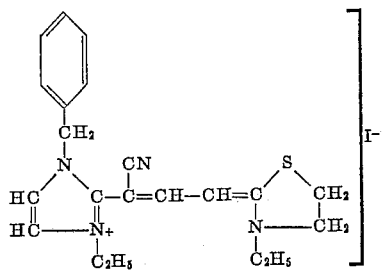

is prepared as follows:

To a solution of 3.53 g. (0.01 mol) of 1-benzyl-2-cyanomethyl-3-ethylimidazolium iodide and 2.32 g. (0.01 mol) of 2-(ω-phenyliminoethylidene)-3-ethyl-thiazolidine in a mixture of 20 cm.³ of pyridine and 5 cm.³ of acetic anhydride, 1.4 cm.³ of triethylamine is added. The reaction mixture is boiled for 15 min. Then the formed dye is precipitated with ether and recrystallized three times from ethanol. Yield: 1 g. (20%). Melting point: 228° C. Absorption maximum: 440 nm. (ε=5.37.10⁴).

EXAMPLE 6

The sensitizing dye of the formula:

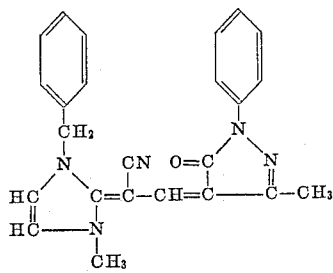

is prepared as follows:

To a solution of 2.7 g. (0.008 mol) of 1-benzyl-2-cyanomethyl-3-methylimidazolium iodide and 2.6 g. (0.008 mol) of 1-phenyl-3-methyl-4-anilinomethylene-2-pyrazoline-5-one in 20 cm.³ of acetic anhydride, 1.2 cm.³ of triethylamine is added. The reaction mixture is boiled for 10 min. Thereupon 10 cm.³ of an ethanol/ether mixture (1:2) is added. The formed dye is allowed to crystallize by cooling in a refrigerator and recrystallized from ethanol. Yield: 0.4 g. (13%). Melting point: above 250° C. Absorption maximum: 495 nm. (ε=3.39.10⁴).

EXAMPLE 7

The sensitizing dye of the formula:

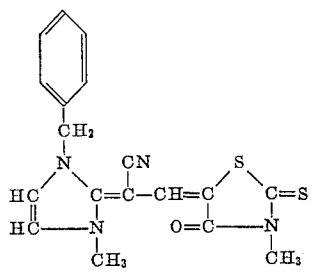

is prepared as follows:

To a solution of 2.8 g. (0.008 mol) of 1-benzyl-2-cyanomethyl-3-methylimidazolium iodide and 2.3 g. (0.008 mol) of 3-methyl-5-acetanilinomethylene-rhodanine in 30 cm.³ of pyridine is added 1.1 cm.³ of triethylamine. The obtained solution is boiled for 15 min. and allowed to cool in a refrigerator, whereby the formed dye crystallizes out. The dye is collected three times from ethyleneglycol monomethyl ether. Yield: 0.2 g. (23%). Melting point: 226° C. Absorption maximum: 500 nm. (ε=7.76.10⁴).

EXAMPLE 8

The sensitizing dye of the formula:

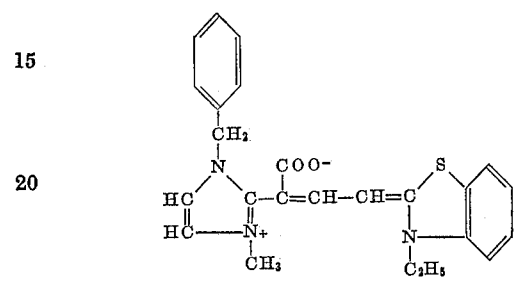

is prepared as follows:

A solution of 2.10 g. (0.004 mol) of 1-benzyl-2-[1-cyano-3-(3-ethyl-2-benzothiazolinylidene)-propenyl]-3-methylimidazolium iodide in 60 cm.³ of 60% aqueous sulphuric acid is boiled for 15 min. The solution is poured into ice and neutralized with ammonium hydroxide. The formed dye is collected and recrystallized twice from ethanol. Yield: 1 g. (50%). Melting point: 248° C. Absorption maximum: 444 nm. (ε=4.17.10⁴).

The dyestuffs of Examples 1–3 are good sensitisers for silver halide emulsions of the negative as well as of the positive type. These dyestuffs optically sensitise silver halide emulsions according to the concentration wherein they are used in a silver halide emulsion with a maximum of 530 to 540 nm.

The dyestuffs of Examples 4 and 5 are especially useful as optical sensitising agents for silver chloride and silver chloro-bromide emulsions, the sensitisation maxima being at 505 and 480 nm. respectively.

The merocyanine dye of Example 7 is especially useful for optically sensitising silver halide emulsions of the negative type, the sensitisation maximum being near 555 nm.

The dyestuff of Example 8 optically sensitises a silver halide emulsion with a maximum near 510 nm.

The new methine dyes are especially useful for extending the spectral sensitivity of the customarily employed gelatino silver chloride, gelatino silver chloro-bromide, gelatino silver bromide, gelatino silver bromo-iodide and gelatino silver chloro-bromo-iodide emulsions. Photographic emulsions containing water-permeable colloids other than gelatin, such as agar-agar, zein, collodion, water-soluble cellulose derivatives, polyvinyl alcohol or other hydrophilic synthetic or natural resins or polymeric compounds, can, however, also be sensitised with the methine dyes according to the present invention.

In order to prepare photographic emulsions sensitised according to this invention with one or more of the new methine dyes, the methine dyes are incorporated in the photographic emulsion by one of the methods customarily employed in the art. In practice, it is convenient to add the dyes to the emulsion in the form of a solution in an appropriate solvent. The new methine dyes can be incorporated at any stage of the preparation of the emulsion and should be uniformly distributed throughout the emulsion. The concentration of the dyes in the emulsion can vary widely, for example from 1 to 200 mg. per kg. of flowable emulsion and will vary according to the effect desired. The suitable and most economical concentration for any given emulsion will be apparent to those skilled in the art, upon making the ordinary tests and observations customarily used in the art of emulsion making.

The new methine dyes can be incorporated into photographic emulsions the general sensitivity of which has been increased by physical and chemical ripening. As suitable chemical sensitisers may be mentioned the well-known sulphur sensitisers such as allyl isothiocyanate, allylthiourea, sodium thiosulphate, potassium selenocyanide, the natural sensitisers originating in the gelatin, the reducing sensitisers such as imino-aminomethane sulphinic acid and the derivatives thereof, further cadmium salts, and the salts of noble metals such as gold, platinum and palladium.

In preparing the photographic emulsions according to the invention, the usual and suitable addenda such as antifogging agents, stabilisers, antibronzing agents, hardeners, wetting agents, plasticisers, development accelerators, colour couplers, fluorescent brighteners and ultra-violet screening compounds can moreover be incorporated in the emulsion in the manner customarily employed in the art. In this respect it may be mentioned that the sensitivity of the silver halide emulsions sensitised according to the process of the present invention is not adversely affected but rather enhanced by the presence therein of certain fluorescent compounds. Another advantage of the process for sensitising silver halide emulsions according to the present invention is the compatibility of the new methine dyes with anionic wetting agents and with colour couplers, which is of great importance in the application of the new methine dyes for sensitising the silver halide emulsions of a light-sensitive element for colour photography.

The photographic emulsions optically sensitised according to the invention may further be supersensitised and/or hypersensitised by one of the methods known to those skilled in the art.

Emulsions sensitised with the new methine dyes can be coated in the usual manner on a suitable support such as glass, cellulose derivative film, resin film or paper.

Although the methine dyes according to the present invention are especially useful for extending the spectral sensitivity of silver halide emulsions, the methine dyes according to this invention also possess optical sensitising properties for photoconductive compounds e.g. photoconductive zinc oxide.

The methine dyes according to this invention preferably are incorporated in a photoconductive layer such as a photoconductive layer containing photoconductive zinc oxide, in an amount of 0.05 to 0.1 mole percent in respect of the photoconductive substance.

The new methine dyes according to this invention can be incorporated in the photoconductive layer by one of the methods customarily employed in the art.

The following photographic tests have been carried out to further illustrate the present invention.

*Series of tests A*

To a silver bromide emulsion containing 0.33 mole of silver halide per kg. (5.5 mole percent of iodide) is added 0.2 millimole of sensitising dye prepared according to Example 7. This emulsion and the non-sensitised comparison emulsion are coated onto separate transparent cellulose triacetate supports in such a way that 0.07 mole of silver halide is present per sq. m.

Figure 2:
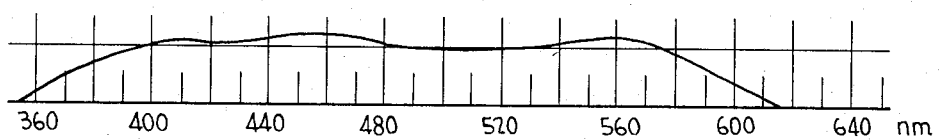
Figure 3:
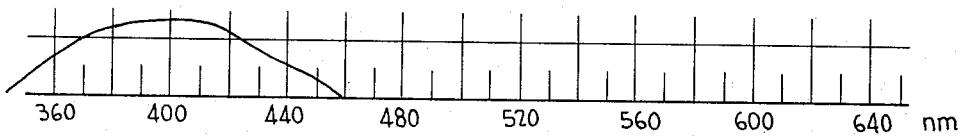
Figure 4:
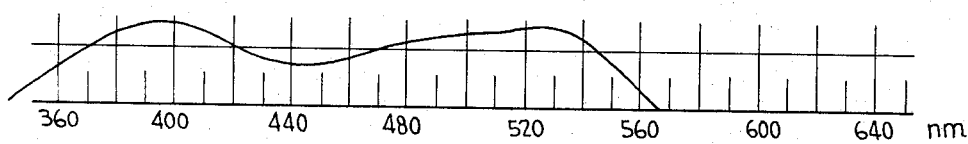
Figure 5:
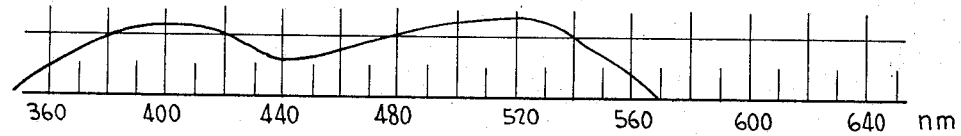
Figure 6:
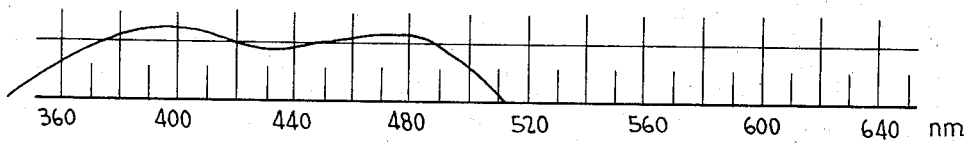

The non-sensitised material, called material $A_1$, and the sensitised material, called material $A_2$ are exposed in a spectrograph through a continuous wedge by means of a light source having a colour temperature of 2850° K., whereupon the exposed materials are developed in the same way. The density versus wavelength (nm.=nanometer) curves of the obtained spectra-prints on the materials $A_1$ and $A_2$ are given in FIG. 1 and 2 respectively. The sensitometric results are listed in Table I.

TABLE I

| Test material | Dyestuff of Example | Millimole of dyestuff per mole of silver halide | Sensitivity (log E) | | Gamma | Fog (dens.) |
|---|---|---|---|---|---|---|
| | | | | Δ | | |
| $A_1$ | | | −0.11 | | 0.78 | 0.09 |
| $A_2$ | 7 | 0.2 | −0.25 | 0.14 | 0.77 | 0.12 |

*Series of tests B*

To from equal amounts of a contrasty silver halide emulsion (76 mole percent of chloride, 23 mole percent of bromide and 1 mole percent of iodide) containing 0.5 mole of silver halide per kg. are added the amounts of sensitiser listed in Table II.

The four emulsions are coated onto separate transparent cellulose triacetate supports in such a way that 0.065 mole of silver halide is present per sq. m.

The materials $B_1$, $B_2$, $B_3$ and $B_4$ thus obtained are exposed and developed as the materials of test series A. Density versus wavelength curves of the spectra-prints are given in FIGS. 3, 4, 5 and 6 respectively.

The sensitometric results are listed in Table II.

TABLE II

| Test material | Dyestuff of Example | Millimole of dyestuff per mole of silver halide | Sensitivity (log E) | | Gamma | Fog (dens.) |
|---|---|---|---|---|---|---|
| | | | | Δ | | |
| $B_1$ | | | 2.35 | | 13.3 | 0.08 |
| $B_2$ | 3 | 0.1 | 1.78 | 0.57 | 10.9 | 0.07 |
| $B_3$ | 2 | 0.1 | 1.75 | 0.60 | 12.0 | 0.07 |
| $B_4$ | 5 | 0.2 | 1.78 | 0.57 | 11.6 | 0.06 |

*Series of tests C*

To nine equal amounts of a zinc oxide depression in toluene containing per liter 3.7 moles of zinc oxide, copoly (vinyl acetate/vinyl laurate) (85/15) as binding agent, and 1% by weight of monobutyl phosphate relative to the amount of zinc oxide are added the amounts of sensitiser listed in Table III.

The sensitised zinc oxide dispersions are coated on an appropriate paper support in such a way that 0.25 mole of zinc oxide is present per sq. m whereupon they are dried.

The materials C thus obtained are negatively charged with a corona and exposed through a step-wedge under the same conditions. After development of the latent image with a triboelectrically charged powder, the relative sensitivities listed in Table III were measured.

TABLE III

| Test material | Dyestuff of Example | Millimole of dyestuff per mole of zinc oxide | Relative sensitivity | Sensitization maximum (nm.) |
|---|---|---|---|---|
| $C_1$ | | | 100 | <380 |
| $C_2$ | 1 | 0.04 | 800 | 485 |
| $C_3$ | 2 | 0.08 | 800 | 485 |
| $C_4$ | 3 | 0.08 | 550 | 490 |
| $C_5$ | 4 | 0.08 | 550 | 465 |
| $C_6$ | 5 | 0.09 | 375 | 445 |
| $C_7$ | 6 | 0.11 | 125 | 510 |
| $C_8$ | 7 | 0.06 | 375 | 505 |
| $C_9$ | 8 | 0.05 | 550 | 460 |

What we claim is:

1. A photographic silver halide emulsion containing a methine dye having the formula:

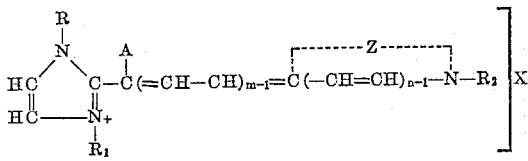

wherein:

A represents a cyano group,
R, $R_1$ and $R_2$ each represent a lower alkyl group having up to 6 carbon atoms and a phenyl group,
n represents an integer of from 1 to 2,
m represents an integer of from 2 to 3,
z represents the atoms necessary to complete a heterocyclic nitrogen nucleus containing 5 to 6 atoms in the heterocyclic ring, and
X represents an acid radical.

2. A photographic silver halide emulsion containing a merocyanine dye having the formula:

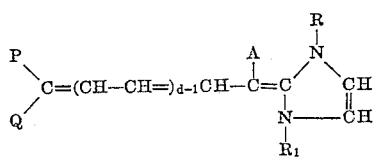

wherein:

A represents a cyano group,
R and $R_1$ each represent a lower alkyl group having up to 6 carbon atoms and a phenyl group,
d represents an integer of from 1 to 2, and
P and Q each represent a member of the group consisting of —CN, —COOR$_7$ wherein R$_7$ is a member of the group consisting of hydrogen or alkyl, and together represent the necessary atoms to close a heterocyclic nucleus selected from the group consisting of pyrazolone nuclei, isoxazolone nuclei, oxindole nuclei, 2,4,6-triketohexahydropyrimidine nuclei, rhodanine nuclei, 2-imidazo[1,2-α]pyridone nuclei, 5,7-dioxo-6,7-dihydro-5-thiazolo[3,2-α]pyrimidine nuclei, 2-thio-2,4-oxazolidinedione nuclei, thianaphthenone nuclei, 2-thio-2,5-thiazolidinedione nuclei, 2,4-thiazolidinedione nuclei, thiazolidone nuclei, 4-thiazolone nuclei, 2-imino-2,4-oxazolinone nuclei, 2,4-imidazolinedione nuclei, 2-thio-2,4-imidazolinedione nuclei, and 5-imidazolone nuclei.

3. A photographic silver halide emulsion containing a methine dye of the formula:

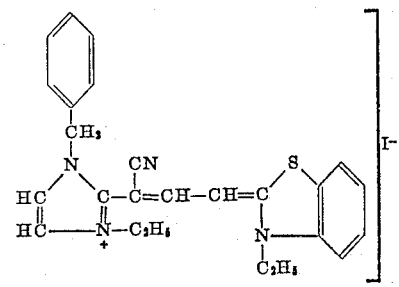

4. A photographic silver halide emulsion containing a methine dye of the formula:

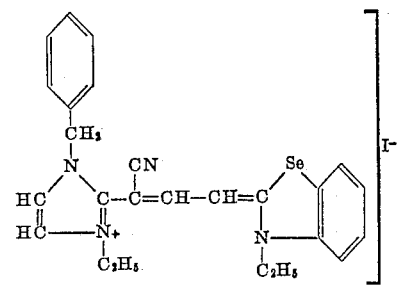

5. A photographic silver halide emulsion containing a methine dye of the formula:

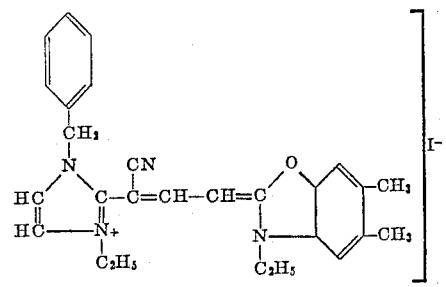

6. A photographic silver halide emulsion containing a methine dye of the formula:

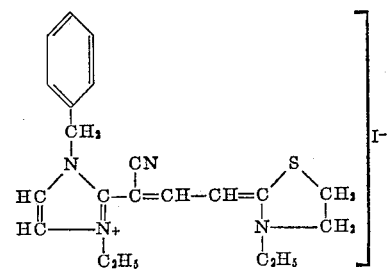

7. A photographic silver halide emulsion containing a methine dye of the formula:

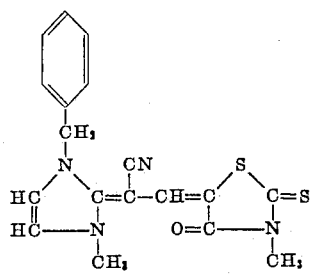

(References on following page)

References Cited

UNITED STATES PATENTS

| | | | |
|---|---|---|---|
| 2,304,981 | 12/1942 | Wilmanns | 96—106 |
| 2,870,014 | 1/1959 | Brooker et al. | 96—106 |
| 2,895,955 | 7/1959 | Haseltire et al. | 260—240.5 |
| 2,918,369 | 12/1959 | Doarenbas | 96—106 |
| 2,984,664 | 5/1961 | Fry et al. | 260—240.5 |
| 3,288,610 | 11/1966 | Gotze et al. | 96—1.7 |

FOREIGN PATENTS

| | | |
|---|---|---|
| 749,189 | 5/1956 | Great Britain. |

J. TRAVIS BROWN, *Primary Examiner.*

NORMAN G. TORCHIN, *Examiner.*